United States Patent [19]

Wheatley

[11] Patent Number: 5,546,141
[45] Date of Patent: Aug. 13, 1996

[54] ADJUSTABLE GLASSES

[76] Inventor: Charles E. Wheatley, 1220 Rambling Hills Dr., Cincinnati, Ohio 45230

[21] Appl. No.: 165,977

[22] Filed: Dec. 13, 1993

[51] Int. Cl.[6] ........................................................ G02C 7/12
[52] U.S. Cl. ................................ 351/49; 351/41; 351/85
[58] Field of Search .............................. 351/49, 86, 85, 351/47, 57, 41, 60

[56] References Cited

U.S. PATENT DOCUMENTS

| | | |
|---|---|---|
| 3,423,149 | 1/1969 | Braunhut . |
| 3,475,765 | 11/1969 | Zeltmann . |
| 3,869,200 | 3/1975 | Danylewich ............................ 351/85 |
| 3,890,037 | 6/1975 | Zingarelli . |
| 3,944,346 | 3/1976 | Shindler . |
| 4,149,780 | 4/1979 | Young . |
| 4,386,832 | 6/1983 | Nannini et al. . |
| 4,878,748 | 11/1989 | Johansen et al. . |
| 4,879,770 | 11/1989 | Vacilotto ............................ 351/86 |
| 4,919,530 | 4/1990 | Hyman ............................ 351/86 |
| 5,355,183 | 10/1994 | Andrea ............................ 351/49 |
| 5,428,410 | 6/1995 | Lei ............................ 351/60 |

*Primary Examiner*—William L. Sikes
*Assistant Examiner*—Hung Xuan Dang
*Attorney, Agent, or Firm*—Frost & Jacobs

[57] ABSTRACT

Sunglasses are provided wherein each lens opening has a fixed polarized lens and a rotatable polarized lens. A slide is carried by the frame, with each rotatable lens being connected thereto at locations outside of the lens openings. Lateral movement of the slide effects the rotation of the rotatable lenses, thereby varying the transitivity of the sunglasses.

17 Claims, 5 Drawing Sheets

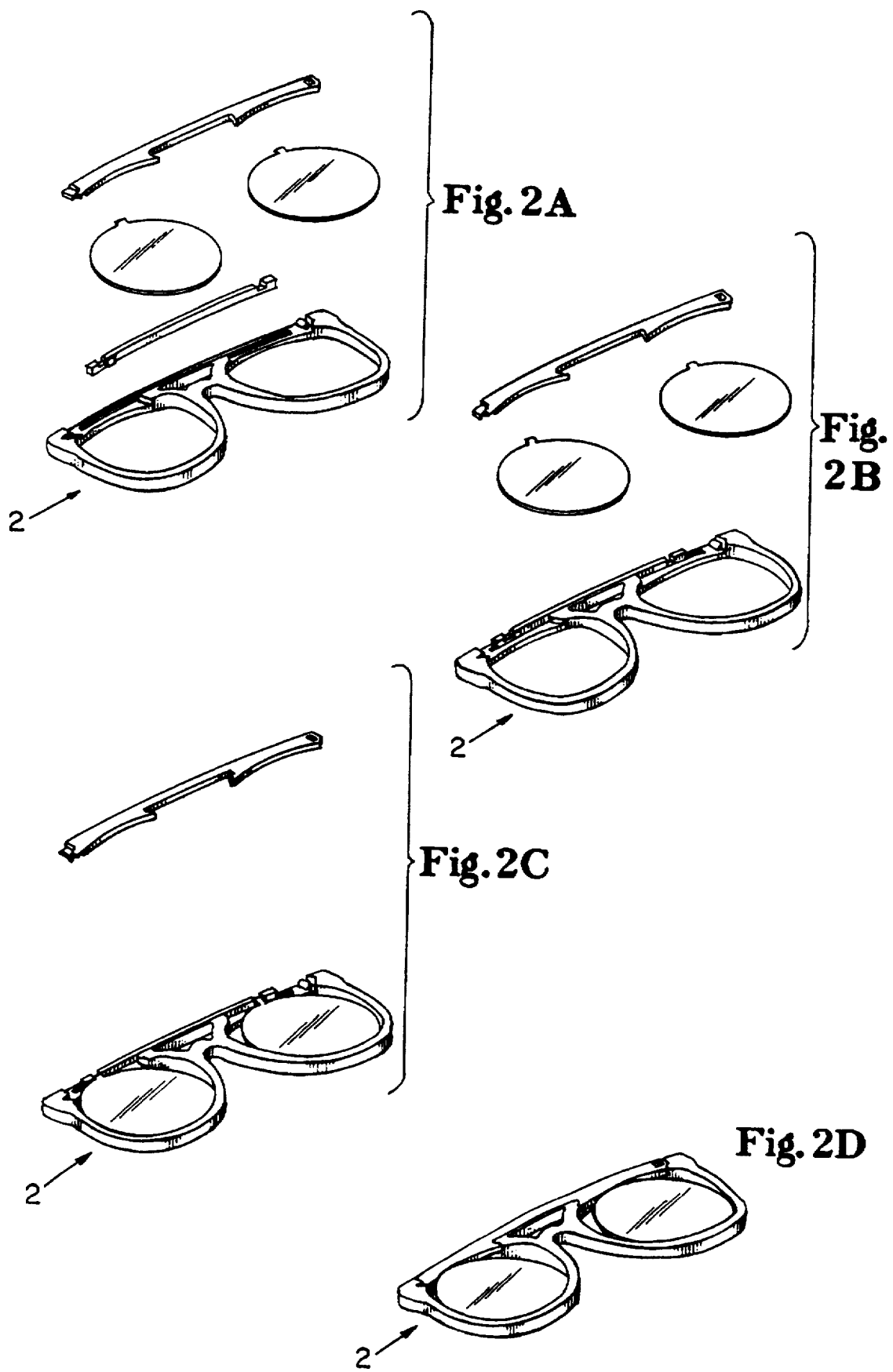

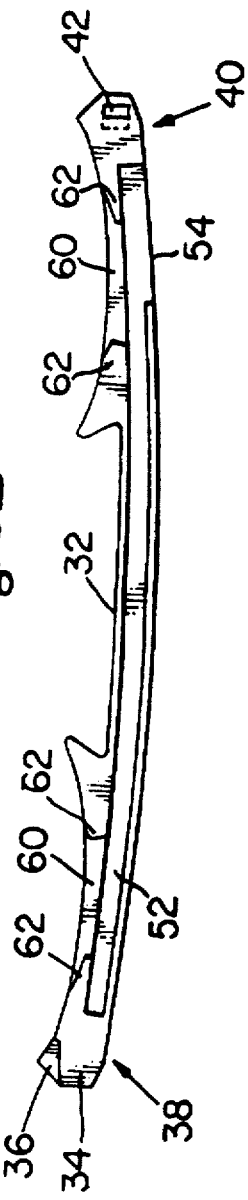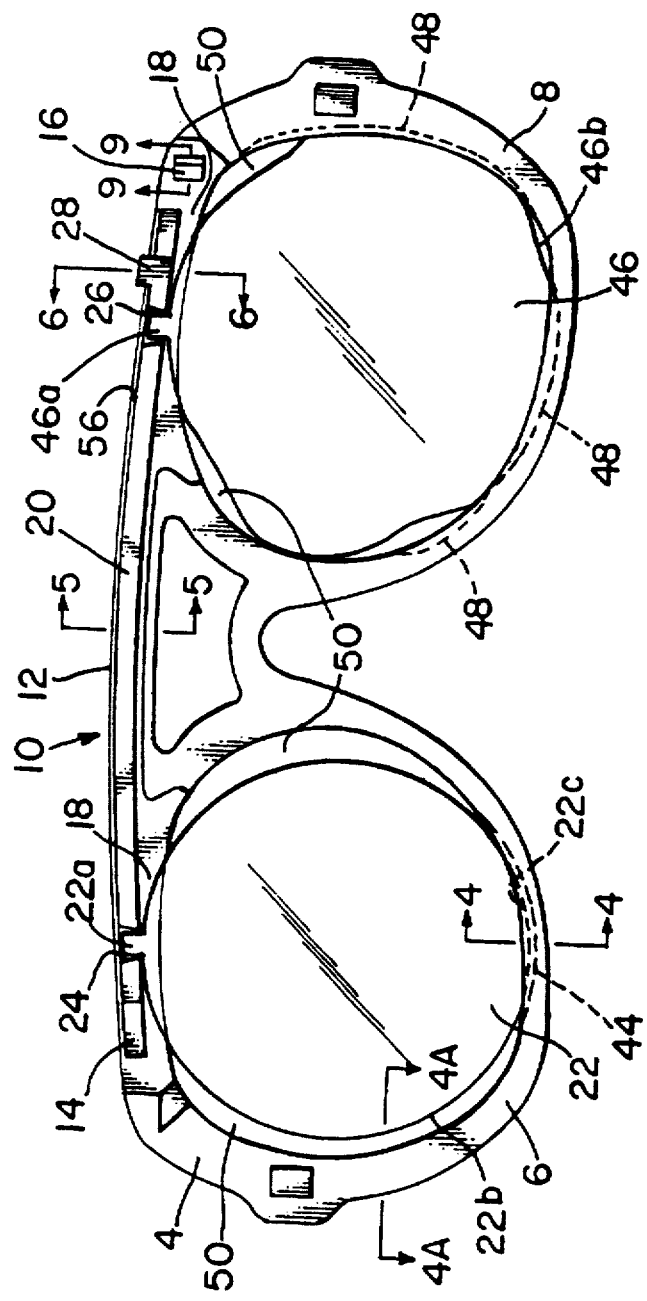

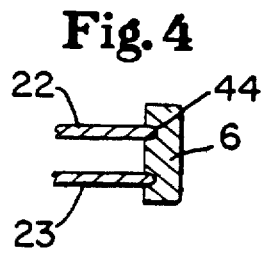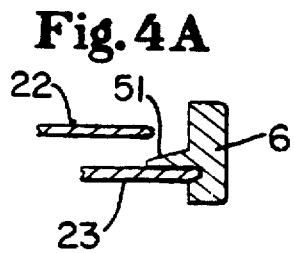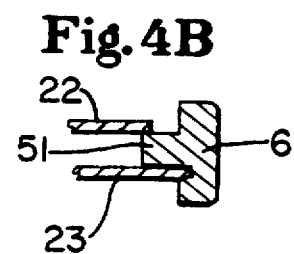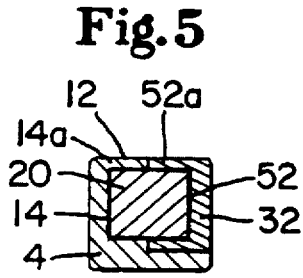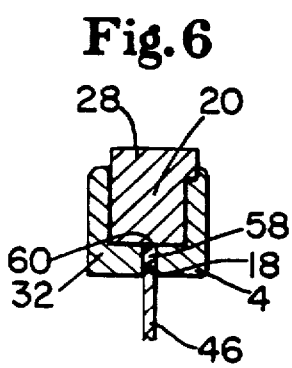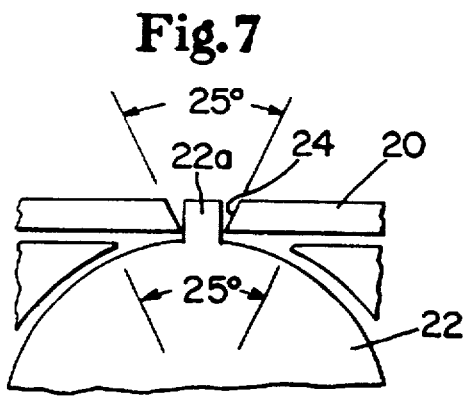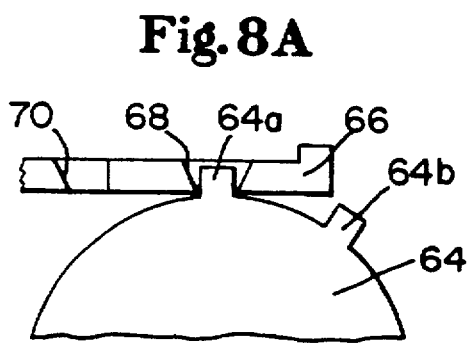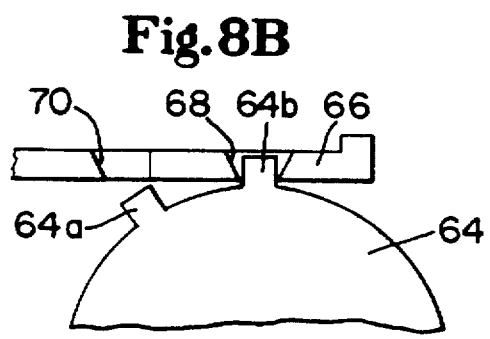

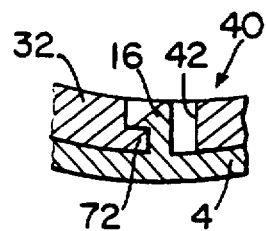
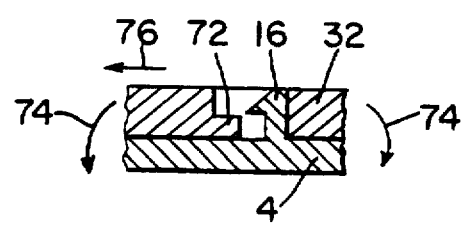
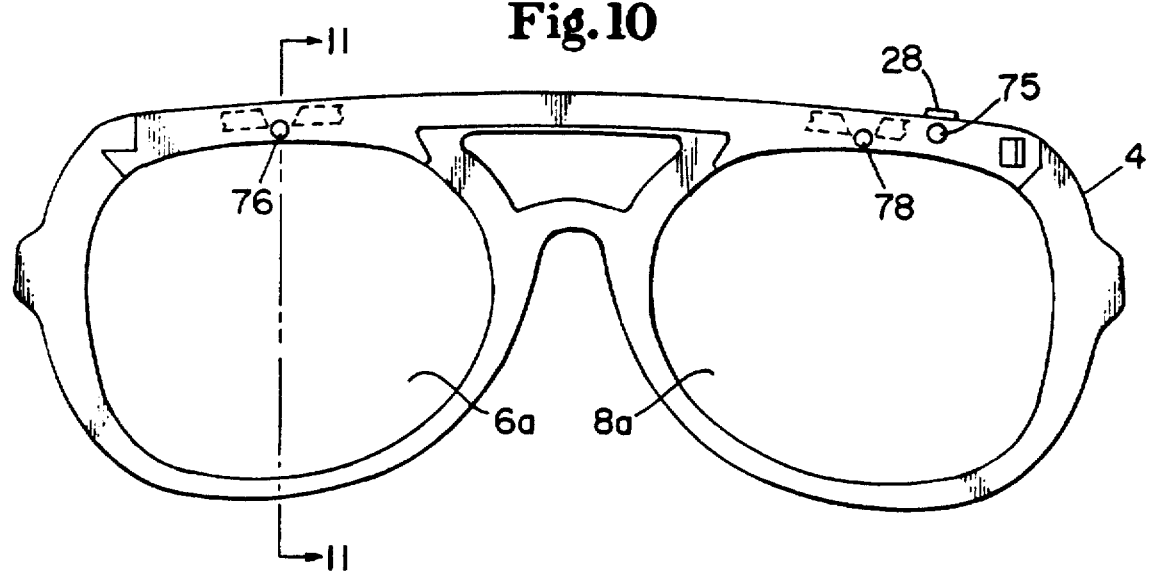
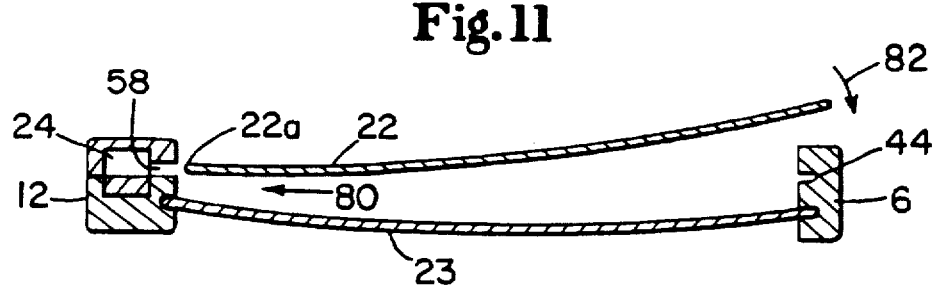

ADJUSTABLE GLASSES

TECHNICAL FIELD

The present invention relates generally to eyeglasses, and is particularly directed to eyeglasses in which a lens may be rotated within the lens opening. The invention will be specifically disclosed in connection with sunglasses having a pair of polarizing lens elements in each eye opening, with one of the lenses of each pair being rotatable with respect to the other lens.

BACKGROUND OF THE INVENTION

Sunglasses having a pair of polarizing lens elements disposed in each eye opening in which one lens of each pair is rotatable with respect to the other lens are well known. Various designs and structures have been used in the prior art to support rotatably the lenses and to effect the simultaneous rotation of the lenses. The prior art structures and mechanisms suffer from a variety of deficiencies as explained below.

One such prior art structure and mechanism is shown in U.S. Pat. No. 3,944,346 Shindler. This structure is comprised of front and rear frame sections, with each section carrying two lens elements disposed in respective lens openings. The rear section, which carries a rotatable lens, is attached to the front section by a threaded screw and nut, or other fastener, located at the bridge of the frames, immediately above the nose. A lens rotating mechanism made of a wire is bent at either end and extends into holes in either rotatable lens, such that both circular lenses may be simultaneously rotated by the horizontal translation and slight rotation of the wire as it is slide from side to side. The movement is effected through the use of a handle which extends forwardly from the front of the frame through a generally horizontal slot formed through the front of the frame.

This structure somewhat typifies the numerous problems with the prior art structures. The two piece frame construction represents an overly complex structure for retaining and rotating the lenses. The complexity of the frame design creates difficulty in the manufacture of the fame. Additionally, the construction of the lens rotating mechanism in combination with the two piece frame limits the ability to adapt the design to aesthetically pleasing, stylish frames. For example, in addition to the unattractive connection between the front and rear frame sections, there is the obtrusive forwardly protruding handle for controlling the rotation of the lenses, all of which are clearly visible to the public when the frames are worn. Additionally, with the '346 structure, the mechanism used for effecting the rotation of the lenses extends into the lens opening where it can distract the wearer.

The prior art glasses disclosed in the '346 patent show circular lenses having peripheral edges which are completely enclosed by the grove in the rear frame section. This effectively precludes the use of more than one set of rotatable lenses. The construction disclosed in the '346 patent permits only a single range within which to vary the orientation of the rotating lenses with respect to the fixed lenses.

As is well known, the amount of light which can pass through a pair of polarizing lenses may be varied by changing the relative orientation of the "axes of polarization" of the two lenses. Polarizing lens elements are available in a variety of absorption values and characteristics. The ability to use more than one set of rotatable lenses would allow the wearer to select rotatable lens elements of different darkness for varying conditions.

In sunglasses having two spaced apart lenses in each lens opening, dirt can get in between the lenses, requiring that the inner and outer surfaces of both lenses be cleaned frequently. In the prior art glasses, such as that shown in the '346 patent, it is necessary to disassemble the front and rear frame sections in order to clean the lenses. Not only is this cumbersome, but it can be quite time consuming.

There is a need in the art for sunglasses which are stylish, simple to manufacture and use, and which can allow the use of a variety of interchangeable lenses while still permitting those lenses to rotate so as to take advantage of the change in light transmission as a result of changes in the orientation of the axes of polarization. The lenses need to be easily removed and replaced, which not only aides in interchangability but greatly simplifies cleaning the lenses. There is also a need in the art to provide for the easy disassembly of any frame members which might be necessarily removed in order to change or clean the lenses.

SUMMARY OF THE INVENTION

It is an object of this invention to obviate the above-described problems in shortcomings of the prior art heretofore available.

It is another object of the present invention to provide eyeglasses having lenses which may be rotated within the lens opening by a simply to use and manufacture, aesthetically pleasing and reliable mechanism which may be adapted into aesthetically pleasing frame designs.

It is yet another object of the present invention to provide sunglasses having pairs of polarizing lens elements in which one of the elements are rotatable with respect to the other element, wherein the rotatable lens elements may be easily removed, cleaned, replaced, and interchanged with other rotatable lens elements of varying transitivity.

It is another object of the present invention to provide a pair of sunglasses in which the rotatable lens elements may be oriented in two or more alignment positions to enable a single rotatable lens element to cover a wider range of rotation.

It is still a further object of the present invention to provide an eyeglass frame which reasonably carries a member wherein the member may be removed from the frame by flexing the frame and the member simultaneously.

It is yet a further object of the present invention to provide an eyeglass frame having rotatable lenses wherein the actuating mechanism is not obtrusive, and generally blends into the design of the frames.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, eyeglasses are provided wherein each lens opening has a fixed lens and a rotatable lens. A slide is carried by the frame, with each rotatable lens being connected thereto at locations outside of the lens openings. Lateral movement of the slide effects the rotation of the rotatable lenses.

In accordance with yet another aspect of the present invention, the slide is disposed in a cavity defined by the frame and a retainer.

In accordance with a further aspect of the present invention, a portion of the slide extends outside of the cavity which allows actuation of the slide.

In accordance with still a further aspect of the present invention, the connection between the slide and the rotatable lenses includes tabs extending from the lenses into respective slots formed in the slide.

In accordance with yet another aspect of the present invention, the rotatable lenses may be selectively connected to the slide in at least two rotational orientations relative to said slide.

In accordance with a further aspect of the present invention, the retainer is secured to the frame by a latch carried by one of the retainer or the frame, and a lip carried by the other, with the latch and lip being selectively moveable with respect to each other between an engaged position and a disengaged position.

In accordance with still another aspect of the present invention, the latch is relatively rigid and the retainer may be released from the frame by flexing the frame and retainer simultaneously in the same direction so as to cause relative motion between said latch and said lip and move the latch and lip into disengagement.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a pan of the specification illustrate several aspects of the present invention, and together with the description serve to explain the principles of the invention. In the drawings:

FIGS. 2A-2D are a series of diagrammatic perspective views showing the assembly of a pair of sunglasses in accordance with the present invention.

FIG. 3A is a rear elevational view of sunglasses with the retainer removed.

FIG. 3B is a from elevational view of the retainer shown in an up side down position overlying FIG. 3A as though the retainer had been removed from the frames shown in FIG. 3A and rotated about its longitudinal axes 180°.

FIG. 4 is a fragmentary cross-sectional view taken along line 4—4 of FIG. 3A.

FIG. 4A is a fragmentary cross-sectional view taken along line 4A—4A of FIG. 3A.

FIG. 4B is a fragmentary cross-sectional view of an alternative embodiment of the section illustrated in FIG. 4A.

FIG. 5 is a cross-sectional view taken along line 5—5 of FIG. 3A with the retainer in place.

FIG. 6 is a cross-sectional view taken along line 6—6 of FIG. 3A with the retainer in place.

FIG. 7 is an enlarged fragmentary view of the connection between the slide and the left rotatable lens of FIG. 3A.

FIGS. 8A and 8B are enlarged fragmentary views of an alternative embodiment of a rotating lens which have two alignment positions with respect to the slide.

FIG. 9 is a fragmentary cross-sectional view taken along line 9—9 of FIG. 3A with the retainer in place.

FIG. 9A is a view similar to FIG. 9 with the frame and retainer flexed into a relatively flat orientation.

FIG. 10 is a plan view of glasses according to the present invention.

FIG. 11 is a cross-sectional view of lens opening 6a illustrating the installation of lens 22.

Figure 1:
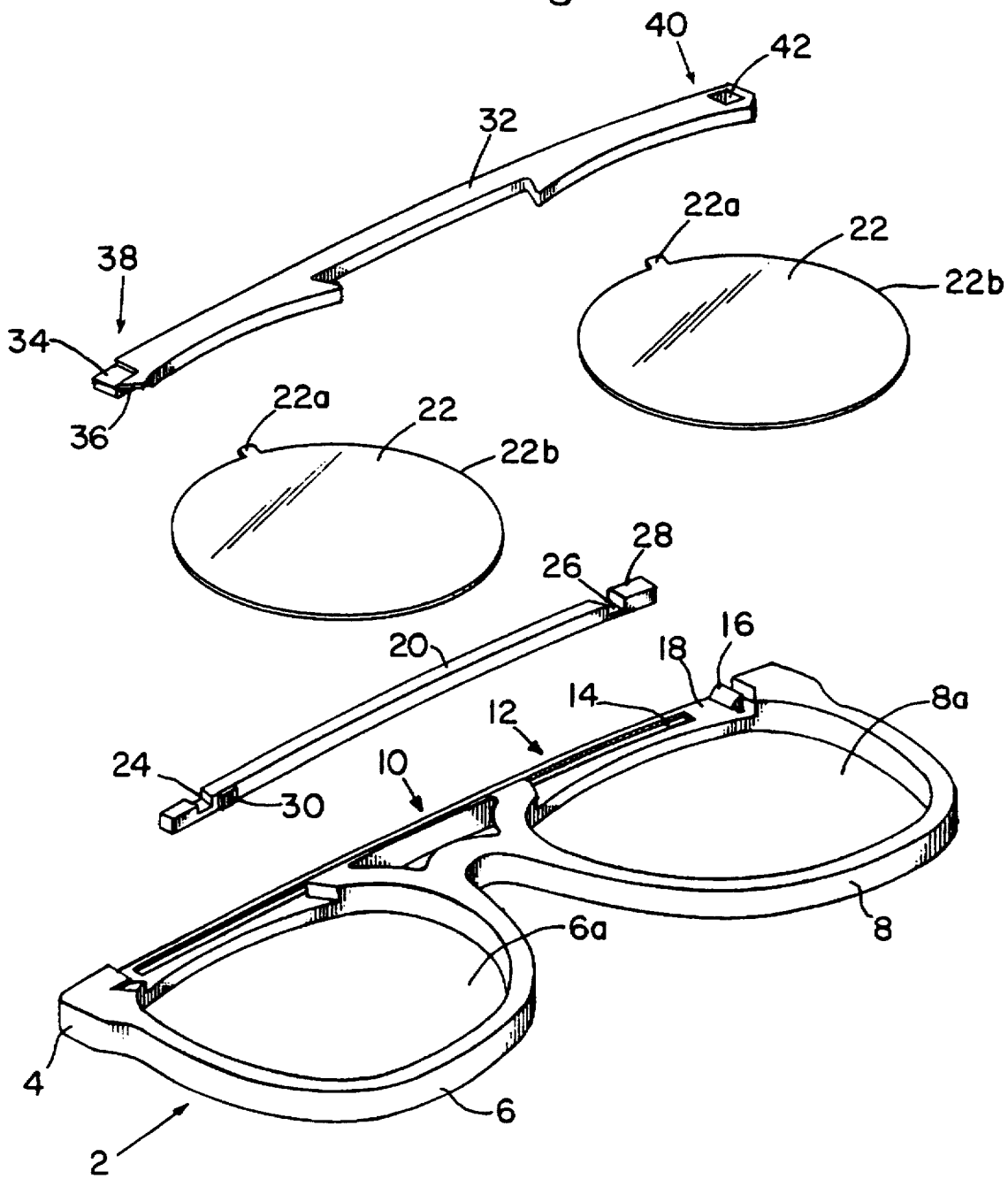
FIG. 1 is an exploded, view of a pair of sunglasses constructed in accordance with the present invention.

Reference will now be made in detail to the present preferred embodiment of the invention, an example of which is illustrated in the accompanying drawings.

DETAILED DESCRIPTION OF THE PREFERRED

Referring to FIG. 1, it can be easily seen that glasses 2 have very few parts which may be easily assembled and disassembled. Frame 4 includes two rims 6 and 8 which define corresponding lens openings 6a and 8a. Bridge portion 10 is interposed between rims 6 and 8, extending across the upper edge 12 of frame 4 as shown in this embodiment. Frame 4 includes a recessed cavity 14 formed therein adjacent upper edge 12, extending to either side of frame 4, overlying lens openings 6a and 8a. Frame 4 also includes latch 16 extending upwardly from surface 18.

Slide 20 is shown as an elongated member having a generally rectangular cross-section. Slide 20 is complimentarily shaped to cavity 14 so as to be slideably disposed within cavity 14, dictating that the length of slide 20 be less than the length of cavity 14. The total available travel of slide 20 when disposed within cavity 14 is selected so as to allow the desired rotation of rotatable lens elements 22. Slide 20 includes two spaced apart slots 24 and 26. The depth of slots 24 and 26 are such to align generally with surface 18. The right end of slide 20 includes extension 28 which extends above upper edge 12, as described below. Slide 20 also includes pad 30 which provides a tighter fit between slide 20 and cavity 14 without the additional drag which could occur if the entirety of slide 20 were made thicker.

Lens elements 22, which are preferably curved (but may be flat), are polarizing lenses which are configured to be rotatably disposed within lens openings 6a and 8a. In order to guaranty uniform transmisivity between each lens opening, the angle between the axes of polarization of each pair of lenses 22 are substantially the same throughout all positions of rotation. To accomplish this, it is preferable that the axes of polarization of lenses 23 (not shown in FIG. 1) relative to the respective lens opening 6a and 8a be the same, and that the orientation of the axis of polarization of each rotatable lens relative to slide 20 be the same for each rotatable lens. The orientation of the axes of polarization of lenses 23 is preferable such that glare is reduced, as is well known in the art.

Although shown as circular in FIG. 1, lens elements 22 may be any shape which is configured and adapted to rotate over the desired angle of rotation within the lens opening in cooperation with the system of grooves (see FIG. 3A). Lens 22 are shown including tabs including 22a extending from peripheral edge 22b of lens 22. When assemble, as described below, tabs 22a are disposed within slots 24 and 26 of slide 20, making a releasable connection therewith. As can be seen in FIG. 3A, this connection does not extend into or move into the lens opening.

Retainer 32 is shaped complimentarily to frame 4 so as to fit generally across the wearer's side of upper edge 12. Upper edge 12 of frame 4 has a thickness which is less than the general thickness of frame 4. When retainer 32 is located adjacent upper edge 12, the overall thickness is approximately the same as the nominal thickness of frame 4. Retainer 32 includes tabs 34 and 36 at the left end which interlock with a complimentarily shaped configuration of the corresponding side of frame 4. This allows end 38 to be disposed in interlocking engagement with the corresponding side of frame 4 when retainer 32 is secured in place to frame 4. End 40 of retainer 32 includes opening 42 which aligns with latch 16 of frame 4 whereby retainer 32 may be removably retained along upper edge 12 of frame 4.

Referring to FIG. 2, there is shown a series of exploded views illustrating the assembly of glasses 2. FIG. 2A is identical to FIG. 1. In FIG. 2B, slide 20 is disposed in cavity 14. In FIG. 2C, lens elements 22 are disposed in lens opening 6a and 8a respectively. Tabs 22a make connections with slide 20, by being disposed within slots 24 and 26 respectively. In FIG. 2D, retainer 32 is carried by frame 4, with tabs 34 and 36 of end 38 interlocking with the corresponding portions of frame 4, and latch 16 extending into opening 42.

Referring now the FIG. 3A, circular lens 22, disposed in lens opening 6a, is supported by groove 44 about portion 22c of peripheral edge 22b. Referring also to FIG. 4, groove 44, slidably carries portion 22c of peripheral edge 22b, keeping lens element 22 in spaced apart relationship from lens 23. As can be seen in FIG. 3A, groove 44 is formed only in a portion of rim 6, disposed adjacent corresponding lens opening 6a, such that only portion 22c of peripheral edge 22b is within groove 44 thereby facilitating removal and installation while providing adequate support for rotation of lens 22. A portion of peripheral edge 22b adjacent tab 22a is slidably carried within the groove (see FIG. 6 below) formed between surface 18 and retainer 32 when retainer 32 is in place. Through this construction, since peripheral edge 22b of lens 22 is not completely encircled by groove 44, lens 22 may be easily removed from lens opening 6a when retainer 32 is disassembled from frame 4. This allows lens 22 to be easily cleaned and replaced, or changed with another lens which may have different characteristics (e.g. lighter or darker).

Although lens 22 is illustrated as being circular in shape, any shape may be used which is configured to cooperate with grooves formed in the rim to allow the lens to rotate through the desired amount. For example, lens 46, which is disposed in lens opening 8a of FIG. 3A has a nonsymmetrical irregular shape. A plurality of grooves 48 are disposed in rim 8 adjacent corresponding lens opening 8a, being located and sized so as to cooperate with the shape of peripheral edge 46b of lens 46 to allow the desired rotation. The shape of lens 46 more completely fills lens opening 8a than the circular shape of lens 22. A similarly shaped lens would be used in lens opening 6a with corresponding grooves.

It is noted that with either shape of lenses 22 or 46, there remains a portion of lens openings 6a and 8a which is not always covered by the rotating lenses. Although these uncovered portions 50 may or may not be noticeable by the wearer, it may be preferable to block portions 50. For example, as shown in FIG. 4A, rims 6 and 8 could include ridge 51 extending inwardly behind lenses 23 located so as to cover portions 50. An alternate embodiment of ridge 51 is shown in FIG. 4B. Many other shapes may be used. A lip may even be provided on the wearer's side of ridge 51 to pilot peripheral edge 22b of circular lens 22.

Referring now to FIG. 3B, retainer 32 includes cavity 52 which is complimentarily shaped with cavity 14 so as to align therewith when retainer 32 is secured to frame 4. Cavity 52 includes opening 54 which corresponds to opening 56 of cavity 14, through which extension 28 of slide 20 extends, thereby being accessible from outside of frame 4 due to said opening. This provides a low profile actuating mechanism to effect the rotation of the lenses which is generally unnoticeable except to the wearer. Other configurations may be used. For example, extension 28 could be located in other positions, such as extending rearwardly, or omitted altogether with slide 20 being accessed through openings on either side of frames 2. Slide 20 could be made of a highly flexible material with cavity 14 extending around the rims with the opening to the environment being on the side of the frame rather than the top.

Referring now to FIG. 5, retainer 32 is shown assembled to frame 4 along upper edge 12. Cavity 52 is aligned with cavity 14, forming a single cavity within which slide 20 is disposed. Alternatively, the cavity could be formed completely within either of frame 4 or retainer 32. It is noted, however, that walls 52a and 14a which form one edge respectively of cavities 52 and 14 provide at least some rigidity to retainer 52 and frame 4, helping to maintain the two pieces in close proximity when assembled.

Referring now FIG. 6, retainer 32 functions not only to define a cavity in which slide 20 is retained, but also defines groove 58 which slidably carries a portion of the peripheral edge of the rotatable lens, in the case shown, edge 46b of lens 46. Groove 58 is formed between surface 18 of frame 4 and surface 60 of retainer 32. Tab 46a (not shown in FIG. 6) extends through groove 58 to connect with slot 26 of slide 20.

Referring now to FIG. 7, a typical connection between the rotating lens and slide 20 is illustrated. The inter fitting parts must be configured and sized to avoid binding. In the connection shown, the walls of slot 24 are formed at an included angle of about 25°. The narrowest portion of slot 24 is wide enough to receive tab 22a. Slot 24 may be open at the top or may be covered by a rib (not shown) for strength, so long as there is clearance at for the end of tab 22a. The end of tab 22a may be rounded to provide free movement between tab 22a and slot 24. As slide 20 is moved from left to right, tab 22a will freely rotate within slot 24 over a range of about 25°. The corresponding portions of frame 4, as well as retainer 32, which define the edges of slot 58, must also be wide enough to allow this rotation. In FIG. 3B, these portions are identified by numeral 62 located on either side of surface 60. As can be easily seen, by this configuration, when slide 20 is translated from side to side, the respective connections between the slide and the rotating lenses remain outside of lens openings 6a and 8a throughout all positions of movement.

In order to provide a greater range of total rotation available from a single rotatable lens, two or more alignment positions, i.e. rotational orientations relative to slide 20, through additional alternative connections between the rotatable lens and slide 20. Referring now to FIG. 8A, lens 64 and slide 66 are shown by themselves for simplicity as an alternative embodiment. Rotatable lens 64 includes tabs 64a and 64b. Slide 66 includes slots 68 and 70. In the first rotational orientation relative to slide 66, tab 64a of lens 64 is disposed within slot 68. Tab 64b is located such that as slide 66 is translated from right to left, there is no interference between tab 64b and slide 66.

FIG. 8B illustrates lens 64 in a second rotational orientation relative to slide 66. In this orientation, tab 64b is disposed within slot 68. As slide 66 is translated left and right, tab 64a may rotate into and out of clearance slot 70, which is sized and located to avoid interference between tab 64a and slide 66. A similar construction at the opposite end of slide 66 may be used for the other lens opening. In such a case, the clearance slot will be located to the right of the primary slot. As will be appreciated, a single tab in combination with two slots may accomplish the same purpose. It is noted that depending upon the exact configuration of the rotatable lens and the location of the tabs, it may be necessary to have additional clearance slots on either side of the primary driving slot.

As previously mentioned, end 40 of retainer 32 is releasably secured to frame 4. Referring now to FIG. 9, frame 4 and retainer 32 are shown having a nominal arcuate complementary configuration. In this normal configuration, latch 16 overlies and engages lip 72 which is formed in retainer 32 adjacent opening 42. In this configuration, end 40 of retainer 32 is securely retained to frame 4. Referring now to FIG. 9A, frame 4 and retainer 32 have been flexed in the direction of arrows 74 to a substantially lens straight configuration. This elastic flexing causes retainer 32 to move in the direction of arrow 76 relative to frame 4. This movement causes lip 72 to move out of engagement with latch 16. Once lip 72 and latch 16 are completely disengaged, retainer 32 becomes free to return to its original arcuate configuration, thereby releasing end 40 from frame 4.

End 40 may be secured to frame 4 by flexing both frame 4 and retainer 32 such that latch 62 extends fully into opening 42, and thereafter holding retainer 32 and frame 4 together while releasing the flex force so that lip 72 engages latch 16 while frame 4 and retainer 32 are allowed to simultaneously return to their nominal arcuate position.

It is noted that this mechanism may also be used even if frame 4 and retainer 32 are normally substantially flat. This may be accomplished by flexing frame 4 and retainer 32 in the direction of arrows 74 into an arcuate position such that lip 72 is released. It is noted that this construction may be used for releasably securing any member to a relatively flexible frame.

Referring to FIGS. 10 and 11, the ease of installing the rotatable lens 22 (or 46) with glasses constructed according to my invention is illustrated. Frame 4 includes indicia 75, with which extension 28 of slide 20 is first aligned. This places slots 24 and 26 in alignment with indicia 76 and 78, respectively, located adjacent each respective lens opening. With such alignment, tab 22a of lens 22 aligned with indicia 76 and is inserted through slot 58 into slot 24, in the direction of arrow 80. The opposite end of lens 22 is rotated toward lens opening 6a in the direction of arrow 82, and snapped into groove 44. This method of insertion is very simple and allows for quick and easy reinstallation of lens 22 (or 46) after, for example, cleaning or change.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

I claim:

1. Eyeglasses comprising:
    (A) a frame having two rims, each rim defining a corresponding lens opening, each of said rims having at least one respective groove disposed adjacent said corresponding lens opening;
    (B) each respective lens opening having a pair of first and second lenses disposed therein, each said second lens being rotatable with respect to the corresponding first lens, each said second lens being slidably carried about at least a portion of its respective peripheral edge by said at least one respective groove of said respective rim, each said second lens being an outer lens;
    (C) a slide carried by said frame, said slide being moveable between a first and a second position, said slide remaining outside of said lens openings throughout all positions of movement; and
    (D) respective releasable connections between said slide and each of said second lenses, such that movement of said slide causes said second lenses to rotate;

whereby said second lenses may be easily removed from said eyeglasses to facilitate cleaning or replacing said first or second lenses.

2. The eyeglasses according to claim 1, wherein both of said releasable connections remain outside of said lens openings throughout all positions of movement of said slide.

3. The eyeglasses according to claim 1, comprising a retainer carried by said frame to retain said slide to said frame.

4. The eyeglasses according to claim 3, comprising a cavity defined by at least one of said frame and said retainer, said slide being disposed at least partially within said cavity.

5. The eyeglasses according to claim 4, wherein said cavity includes an opening, at least a portion of said slide being accessible from the outside due to said opening.

6. The eyeglasses according to claim 5, wherein at least a portion of said slide is disposed in said opening.

7. The eyeglasses according to claim 4, comprising a respective groove disposed adjacent each said lens opening and defined by said frame and said retainer, each said respective groove being in communication with said cavity, each said second lens being slidably carried about at least a portion of its respective peripheral edge by said respective groove.

8. The eyeglasses according to claim 3, comprising a respective groove disposed adjacent each said lens opening and defined by said frame and said retainer, each said second lens being slidably carried about at least a portion of its respective peripheral edge by said respective groove.

9. The eyeglasses according to claim 3, comprising means for releasably securing said retainer to said frame.

10. The eyeglasses according to claim 9, wherein said means comprises a latch carried by one of said retainer and said frame and a lip carried by the other of said retainer and said frame, said latch and said lip being selectively movable relative to each other between an engaged position and a disengaged position.

11. The eyeglasses according to claim 10, wherein said latch is relatively rigid and said retainer may be released from said frame by flexing said frame and said retainer simultaneously in the same direction so as to cause the relative motion between said latch and said lip necessary to move said latch and said lip into said disengaged position.

12. The eyeglasses according to claim 1, wherein said releasable connections comprise respective tabs extending from each respective second lens and respective slots defined by said slide and configured to receive said respective tabs.

13. The eyeglasses according to claim 1, wherein each said second lens may be selectively connected to said slide in at least two rotational orientations relative to said slide.

14. The eyeglasses according to claim 13, wherein said releasable connections comprise a respective plurality of tabs extending from each respective second lens and at least one respective slot corresponding to each second lens defined by said slide and configured to receive a respective one of said tabs.

15. The eyeglasses according to claim 1, wherein said slide substantially retains the same shape throughout its full range of movement between said first and second positions.

16. Eyeglasses comprising:
   (A) a frame having two rims, each rim defining a corresponding lens opening, each of said rims having at least one respective groove disposed adjacent said corresponding lens opening;
   (B) each respective lens opening having a pair of first and second lenses disposed therein, each said second lens being rotatable with respect to the corresponding first lens, each said second lens being slidably carried about less than all of its respective peripheral edge by said at least one respective groove of said respective rim, each said second lens being an outer lens;
   (C) a slide carried by said frame, said slide being moveable between a first and a second position; and
   (D) respective releasable connections between said slide and each of said second lenses, such that movement of said slide causes said second lenses to rotate;

whereby said second lenses may be easily removed from said eyeglasses to facilitate cleaning or replacing said first or second lenses.

17. The eyeglasses according to claim 16, wherein said slide substantially retains the same shape throughout its full range of movement between said first and second positions.

* * * * *

UNITED STATES PATENT AND TRADEMARK OFFICE
CERTIFICATE OF CORRECTION

PATENT NO. : 5,546,141
DATED : August 13, 1996
INVENTOR(S) : Charles E. Wheatley It is certified that error appears in the above-indentified patent and that said Letters Patent is hereby corrected as shown below:

Item [57]
Abstract, line 6, "transitivity" should read --transmisivity--.
Column 1, line 57, "grove" should read --groove--.
Column 2, line 37, "transitivity" should read --transmisivity--.
Column 3, line 42, "pan" should read --part--.
Column 3, line 53, "from" should read --front--.

Signed and Sealed this

Thirty-first Day of December, 1996

Attest:

BRUCE LEHMAN

Attesting Officer    Commissioner of Patents and Trademarks